(12) United States Patent
Raza et al.

(10) Patent No.: US 7,072,031 B2
(45) Date of Patent: Jul. 4, 2006

(54) ALIGNMENT LASER FOR USE IN CROSS-CONNECTS

(75) Inventors: Humair Raza, Sunnyvale, CA (US); Robert Ward, St. Charles, IL (US); Rajiv Ramaswami, Sunnyvale, CA (US); Babu Narayanan, San Jose, CA (US)

(73) Assignee: Nortel Networks, Ltd., St. Laurent (CA)

( * ) Notice: Subject to any disclaimer, the term of this patent is extended or adjusted under 35 U.S.C. 154(b) by 330 days.

(21) Appl. No.: 10/383,437

(22) Filed: Mar. 7, 2003

(65) Prior Publication Data

US 2004/0047542 A1 Mar. 11, 2004

Related U.S. Application Data

(60) Provisional application No. 60/368,075, filed on Mar. 27, 2002.

(51) Int. Cl.
*G01B 11/26* (2006.01)
*G01C 1/00* (2006.01)

(52) U.S. Cl. .......... 356/139.04; 385/16; 385/17; 385/18

(58) Field of Classification Search .......... 356/138, 356/139.04, 139.07; 385/16, 17, 18, 19, 385/24, 128
See application file for complete search history.

(56) References Cited

U.S. PATENT DOCUMENTS

| | | | |
|---|---|---|---|
| 6,445,844 B1 * | 9/2002 | Neukermans et al. | 385/18 |
| 6,549,691 B1 * | 4/2003 | Street et al. | 385/18 |
| 6,600,849 B1 * | 7/2003 | Ducellier et al. | 385/17 |
| 6,606,427 B1 * | 8/2003 | Graves et al. | 385/17 |
| 6,650,803 B1 * | 11/2003 | Ramaswami et al. | 385/17 |
| 6,693,926 B1 * | 2/2004 | Cayrefourcq et al. | 372/14 |
| 6,813,407 B1 * | 11/2004 | Ramaswami et al. | 385/16 |
| 6,819,815 B1 * | 11/2004 | Corbalis et al. | 385/16 |
| 6,882,765 B1 * | 4/2005 | Erickson et al. | 385/16 |
| 2003/0223726 A1 * | 12/2003 | Neukermans et al. | 385/140 |

* cited by examiner

*Primary Examiner*—Layla G. Lauchman
(74) *Attorney, Agent, or Firm*—John C. Gorecki

(57) ABSTRACT

Apparatus and methods are disclosed for alignment of an input mirror and an output mirror in a photonic cross-connect.

11 Claims, 4 Drawing Sheets

Core Loss (i, j) = 9*(P_2 +X2) - (0.05/0.95)*(P_1 + X1) (alignment laser)
Core Loss (i, j) = 9*(P_2 +X2) -19*(P_1 + X1) (client signal)
Ins Loss (i, j) = Core Loss (i, j) dB + SP + SW + 2*SC
Where X1/X2 = Loss for input/output TAP (2 MTP-12 connectors)
SP/SW = 3-dB splitter/1x2 switch loss (stored in QPM EEPROM)
SC = SC connector loss (typically 0.15 dB)

ALIGNMENT LASER FOR USE IN CROSS-CONNECTS

REFERENCE TO PENDING PRIOR PATENT APPLICATION

This patent application claims benefit of pending prior U.S. Provisional Patent Application Ser. No. 60/368,075 filed Mar. 27, 2002 by Humair Raza et al. for ALIGNMENT LASER CONFIGURATION AND APPLICATIONS, which patent application is hereby incorporated herein by reference.

FIELD OF THE INVENTION

This invention relates to apparatus and methods for aligning optical components, and more particularly to alignment lasers for providing a source of light to align input and output mirrors between ports of an optical cross-connect switch.

BACKGROUND OF THE INVENTION

Due to the optical nature of a switching fabric in a MEMS-based photonic cross-connect (PXC), some form of light source is needed to align appropriate sets of input and output mirrors in an optical cross-connect switch. Under normal operating conditions, a client signal acts as the light source. However, under other operating conditions, when no client signal is available, and/or when no other external signal is available, cross-connects cannot be established. Accordingly, a source of light for making cross-connects is desired.

SUMMARY OF THE INVENTION

One object of the present invention is to provide apparatus having an internal source of light for the alignment of input and output mirrors in an optical cross-connect.

Another object of the present invention is to provide apparatus having an alignment laser as the internal source of light for the alignment of input and output mirrors in an optical cross-connect where a client signal is not available to effect alignment.

Still another object of the present invention is to provide apparatus having an alignment laser as the internal source of light for the alignment of input and output mirrors in an optical cross-connect where client signal is not available at the time of effecting alignment.

Yet another object of the present invention is to provide apparatus having an alignment laser as the internal source of light, within an appropriate out-of-band spectrum, for the alignment of input mirrors and output mirrors in an optical cross-connect where external light may be present.

Another object of the present invention is to provide a method for aligning an input mirror and an output mirror in an optical cross-connect.

With the above and other objects in view, as will hereinafter appear, there is provided an apparatus for alignment of an input mirror and an output mirror in a photonic cross-connect, the apparatus comprising: a first port and a second port selectively connected to one another over a first optical datapath therebetween, the first optical datapath containing the first input mirror and the first output mirror therein; and a first alignment laser optically connected to the first optical datapath so as to selectively inject light along the first optical datapath, wherein the light injected along said first optical datapath is analyzed to provide feedback data for alignment of the first input mirror and the first output mirror.

In accordance with a further feature of the present invention, there is provided a method for alignment of a first input mirror and a first output mirror in a photonic cross-connect, the method comprising: injecting light from a first alignment laser into a first optical datapath, wherein the first alignment laser is disposed within the photonic cross-connect, and wherein the first optical datapath passes through the first input mirror and the first output mirror; and analyzing the light from the first alignment laser at a portion of the first optical datapath subsequent to the first input mirror and the first output mirror.

The above and other features of the invention, including various novel details of construction and combinations of parts and method steps, will now be more particularly described with reference to the accompanying drawings and pointed out in the claims. It will be understood that the particular devices and method steps embodying the invention are shown by way of illustration only and not as limitations of the invention. The principles and features of this invention may be employed in various and numerous embodiments without departing from the scope of the invention.

BRIEF DESCRIPTION OF THE DRAWINGS

These foregoing and other objects and features of the present invention will be more fully disclosed by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

Figure 1:
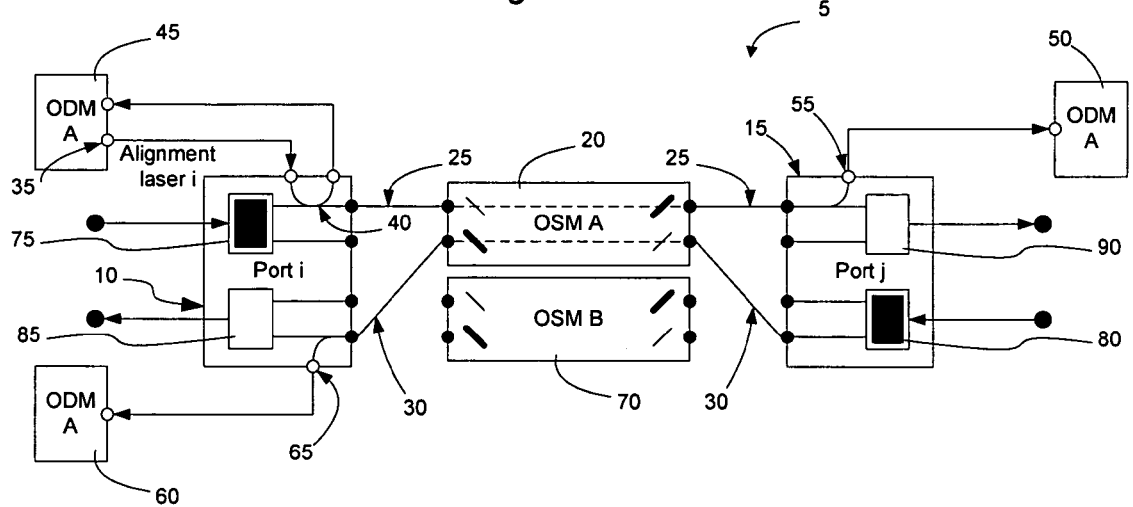
FIG. 1 is a schematic view of one embodiment of the present invention wherein alignment laser light is injected through passive couplers.

Referring first to FIG. 1, there is shown a photonic cross-connect and alignment laser configuration 5 comprising first and second port modules 10, 15. A first optical signal module 20 (also referred to hereinbelow as OSM 20) is shown between first and second ports 10, 15. First and second optical datapaths 25, 30 each extend between first and second port modules 10, 15 and through first OSM 20. An alignment laser 35 is shown in optical connection with first datapath 25 through a first coupler (or tap) 40. A first optical data module 45 (also referred to hereinbelow as ODM 45) is shown in optical connection with first datapath 25 through first coupler 40. A second optical data module 50 (also referred to hereinbelow as ODM 50) is shown in optical connection with first datapath 25 through a second coupler 55. A third optical data module 60 (also referred to hereinbelow as ODM 60) is shown in optical connection with second datapath 30 through a third coupler 65. A second optical signal module 70 (also referred to hereinbelow as OSM 70) is shown in an unconnected state relative to first and second port modules 10, 15. OSM 70 is selectively configured for enabling additional optical datapaths (not shown) between first and second port modules 10, 15. First and second 3-dB splitters 75, 80 are shown positioned in first and second ports 10, 15, respectively. First and second 1×2 switches 85, 90 are shown positioned in first and second port modules 10, 15, respectively.

In this configuration, alignment laser 35 injects laser light into first optical datapath 25 through first coupler (or tap) 40 provided in first port module 10. This light is detected by ODM 50 so as to verify the integrity of the datapath. The operating wavelength range of alignment laser 35 can be inside or outside the range of wavelengths utilized by the possible input signals that travel through port module 10. In an embodiment in which the wavelength of alignment laser 35 is within the range of input wavelengths, interaction must be avoided between the input signal from first port module 10 and the alignment laser light from alignment laser 35. Alternatively, if the selected wavelength of alignment laser 35 is outside the range of the operating wavelengths of the client signals passing through port module 10, the use of alignment laser 35 is greatly simplified. In this case, the input signal coupling into first optical path 25 may include the same power rating as alignment laser 35.

Figure 2:
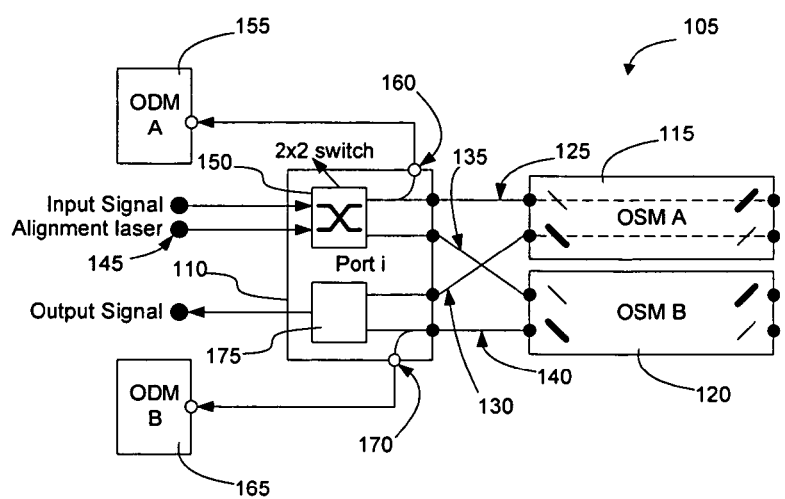
FIG. 2 is a schematic view of another embodiment of the present invention illustrating realignment laser light injection through 2×2 switches at the input of a port module.

Referring now to FIG. 2, there is shown a photonic cross-connect and alignment laser configuration 105 comprising a port module 110, and first and second optical signal modules 115, 120 (also referred to hereinbelow as OSM 115, 120). First and second optical datapaths 125, 130 each extend between port module 110 and OSM 115. Third and fourth optical datapaths 135, 140 each extend between port module 110 and OSM 120. An alignment laser 145 is shown optically connected to first optical signal module 110. A 2×2 switch connects an input signal and alignment laser 145 with first optical datapath 125 and third optical datapath 135. A first optical data module 155 (also referred to hereinbelow as ODM 155) is shown in optical connection with first optical datapath 125 through a first coupler 160. And a second optical data module 165 (also referred to hereinbelow as ODM 165) is shown in optical connection with fourth optical datapath 140 through a second coupler 170.

In an embodiment of the present invention, an input signal or external signal is applied to one of the cores (i.e., OSM 115), and alignment laser 145 is used to keep a connection through the backup switch core (i.e., OSM 120). Accordingly, this embodiment provides 1:1 equipment protection.

External Light Source

Referring again to FIGS. 1 and 2, a laser light source, i.e., alignment laser 35 (FIG. 1) and/or alignment laser 145 (FIG. 2), is illustrated as part of one of the optical data modules, i.e., ODM 45 and/or ODM 155, of photonic cross-connect configuration 5 or 105, respectively. However, similar configurations with these associated properties are also achieved through the use of an external laser light source as discussed hereinbelow.

Shared Internal/External Source

Referring now to FIG. 2, there is shown alignment laser 145 coupled with 2×2 switch 150 so as to provide 1:2 sharing. Alignment laser 145 is used to provide input light for the two cores, which contain OSM 115 and OSM 120. The sharing of alignment laser 145 can be extended to an m:n ratio, where m represents the number of internal or external laser sources for n port modules. For redundant core architectures, the signal is split 2n ways for a single laser source. Alternatively, each signal is split n ways with an independent light source for each core.

Looking now at FIG. 3, there is shown a photonic cross-connect and alignment laser configuration 205 comprising first and second port modules 210, 215, and first and second optical signal modules 220, 225 (also referred to hereinbelow as OSM 220, 225). First and second optical datapaths 230, 235 each extend between port module 210 and OSM 220. A first alignment laser 240 (also referred to hereinbelow as a high power laser 240) is selectively optically connectable to port modules 210, 215 through a first n way coupler 245. In this embodiment of the present invention, first alignment laser 240 and n way coupler 245 are shown selectively optically connected to correspond to OSM 220 through port module 210. A second alignment laser 250 (also referred to hereinbelow as a high power laser 250) is selectively, optically connectable to port modules 210, 215 through a second n way coupler 255. In this embodiment of the present invention, second alignment laser 250 and second n way coupler 255 are shown in an optically unconnected condition to OSM 225. However, second alignment laser 250 and second n way coupler 255 are selectively optically connectable to OSM 225. First and second 3-dB splitters 260, 265 are configured in first and second port modules 210, 215, respectively, so as to transmit input signals to first and second OSM's 220, 225. First and second 1×2 switches 270, 275 are configured in first and second port modules 210, 215, respectively, so as to receive output signals from first and second OSM's 220, 225.

Figure 3:
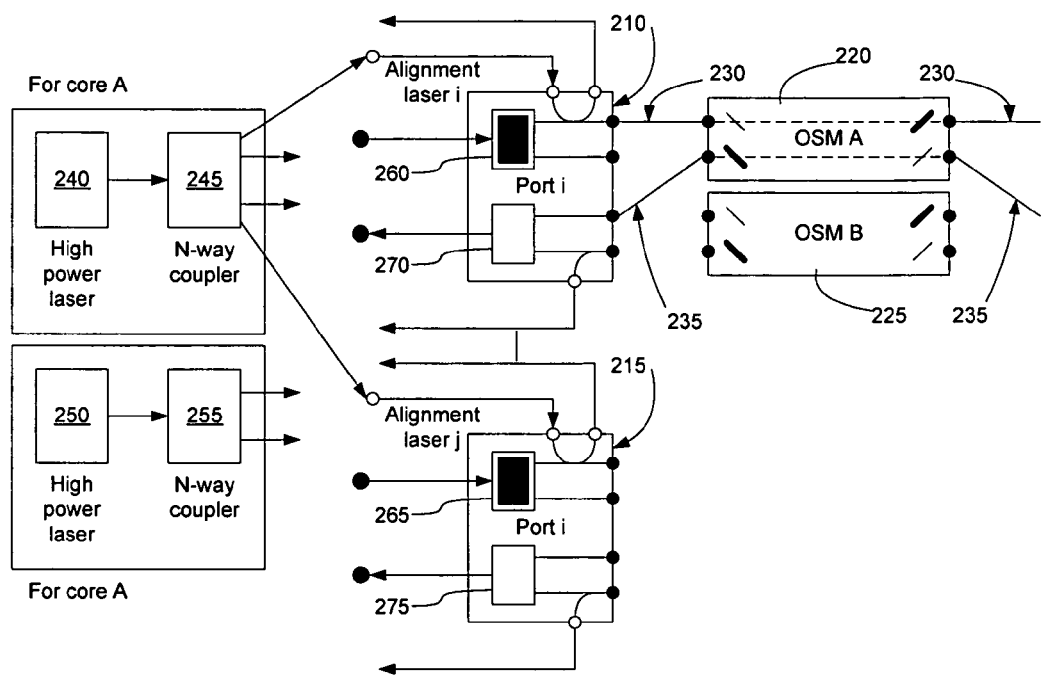
FIG. 3 is a schematic view of another embodiment of the present invention illustrating an external alignment laser shared by two port modules.

Referring still to FIG. 3, the coupling of each of first alignment laser 240 and second alignment laser 250 is shown through taps 245, 255, i.e., first n way coupler 245 and second n way coupler 255, respectively. In an alternative embodiment of the present invention, coupling can also be achieved through 2×2 switches (not shown) as demonstrated in FIG. 2.

Injecting Laser Light from the Output Port

Referring now to FIGS. 1–3, photonic cross-connect and alignment laser configurations 5, 105, 205 may be modified so that the light from alignment laser 35, 145, 240 or 250 is injected through the switch core in the opposite direction to that of the external signal. In such a construction, couplers or taps are supported at the output port. Light source 35, 145, 240 or 250 can be an internal or an external photonic cross-connect and laser configuration. In addition, light source 35, 145, 240 or 250 can be dedicated to each specific port or be a shared resource in a configuration having an m:n ratio.

Alignment Laser Applications

Alignment lasers may be used to create cross-connects in the absence of a client signal. Such cross-connects may be requested from a variety of applications including, but not limited to, normal cross-connect requests from users, system-initiated maintenance of cross-connects, on-demand verification of cross-connects, self-calibration of mirrors, and shared mesh protection.

For a condition when a user-initiated or system-initiated cross-connect request is received and a client signal is not available, the light source provided by the alignment laser can be used to make such a cross-connect. Some applications, such as system-initiated maintenance of cross-connects, are active only when a client signal is not present, and by default will require the use of alignment lasers. In some cases, however, it may also be necessary to use an alignment laser in the presence of an external client signal.

In addition to cross-connect related activities, the alignment laser can also be utilized for other system activities such as diagnostics performed at equipment provisioning time and fault isolation within the optical path through the switch core. These additional embodiments are briefly described hereinbelow.

The absence of a client signal refers to the absence of an external light source that can be utilized to create a cross-connect. This term should not be confused with the SONET LOS which, depending on the behavior of an attached OEO or client port, may still have an associated light through an AIS signal.

User-Initiated Cross-Connect Requests

Under normal circumstances, when a cross-connect request is received and some form of external light is available, either through a valid client signal or an AIS, this external light can be used to create the requested cross-connect. In other cases, the alignment laser is utilized to create such cross-connects in the presence or absence of external client signal.

In an embodiment of the present invention, a method is provided in which the alignment laser light is not allowed to leave the system. In other cases, however, the alignment laser light can be allowed to leave the system. In the absence of an external signal, the alignment laser light is required to align an appropriate set of mirrors. Alternatively, in the presence of an external client signal, the use of the alignment laser light is driven by the need to isolate the mirror alignment process from the fluctuation of the external client signal.

This behavior is applicable to various types of cross-connects such as, but not limited to, equipment and facility protected cross-connects, internal loop-back, and test access, etc.

There are various ways to implement the creation of a cross-connect through the use of an alignment laser. Some of these various ways are discussed hereinbelow.

Implementation with Forced Serialization of Alignment Laser Operation

Figure 4:
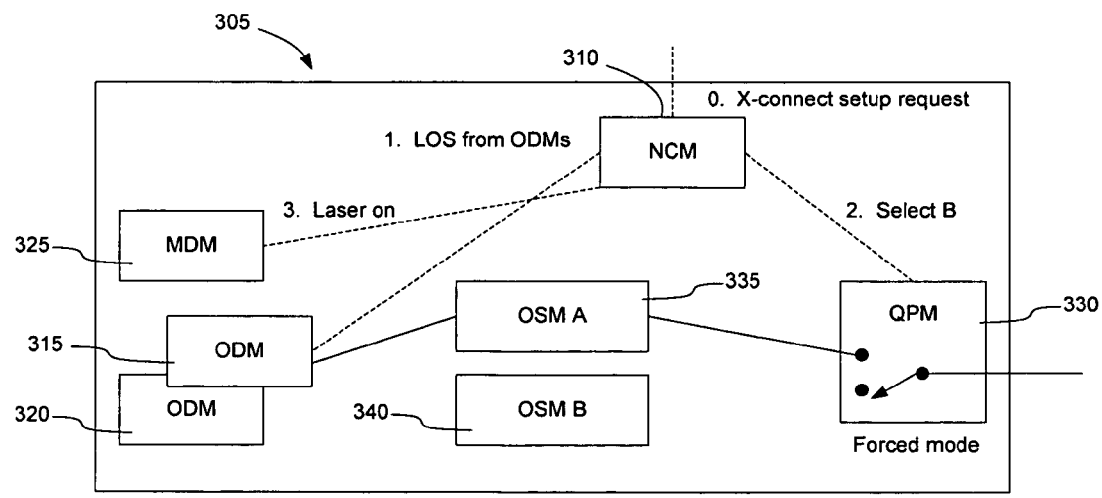
FIG. 4 is a schematic view of another embodiment of the present invention illustrating an implementation scheme for forced serialization of alignment laser operation.

Referring now to FIG. 4, there is shown a forced serialization system 305 for operation of an alignment laser (not shown). A NCM 310, i.e., a shelf controller 310, is shown having a configuration to receive a cross-connect request from a component (not shown) external to forced serialization system 305. NCM 310 is also shown having a configuration to receive internal LOS indications from an optical detector module 315 (also referred to hereinbelow as ODM 315) in core A and from an optical detector module 320 (also referred to hereinbelow as ODM 320) in core B. A mirror driver module 325 (also referred to herein as MDM 325) in core A and a mirror driver module (not shown) in core B control an alignment laser A (not shown) in ODM 315 and an alignment laser B (not shown) in ODM 320, respectively. A quad port module 330 (also referred to hereinbelow as QPM 330) is selectively configurable so as to receive signals from core A or core B. An optical signal module 335 (also referred to hereinbelow as OSM 335) and an optical signal module 340 (also referred to hereinbelow as OSM 340) are each operably connected to NCM 310 so as to allow the alignment laser (not shown) in core A to be activated by NCM 310 through MDM 325.

Implementation Without Allowing Light to Leave the System

Still looking at FIG. 4, there is provided a method for controlling the operation of the alignment laser (not shown) using system 305. System 305 may be configured such that alignment laser light (not shown) is not permitted to leave the system. System 305 may also be configured such that the alignment laser (not shown) is turned off within ODM 315 and ODM 320 in the presence of a client signal (not shown).

One method to satisfy each of the above configurations is to serialize the operation of the alignment laser (not shown) for both core A and core B. Hence, the alignment laser (not shown) is required to be on at a given time for only one of core A or core B. The benefit of this approach is that the onset of a client signal is able to be detected in addition to making sure that the light from the alignment laser (not shown) does not leave system 305. However, this embodiment involves coordination between various modules within the photonic cross-connect (PXC) to operate each alignment laser (not shown). This may not be suitable for real-time control required for some applications such as, for example, shared mesh protection. This method comprises NCM 310 receiving a cross-connect request, NCM 310 receiving internal LOS indications from both ODM 315 and ODM 320, NCM 310 forcing a 1×2 switch on QPM 330 to select a signal from core A, and NCM 310 instructing MDM 335 to turn on the alignment laser (not shown) residing in ODM 315. After a cross-connect is set up in core A, the process is repeated for core B.

Implementation Scheme Allowing the Light to Leave the System

Figure 5:
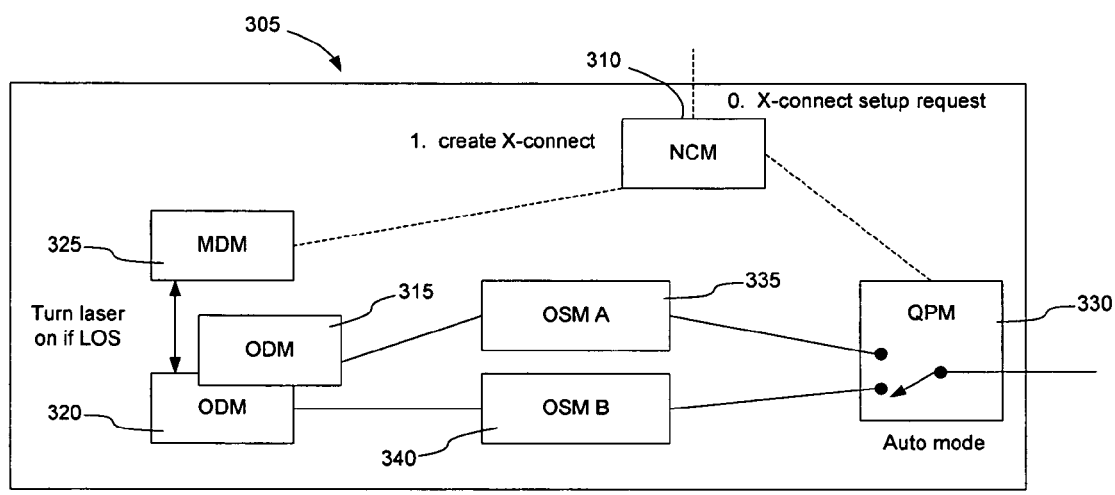
FIG. 5 is a schematic view of another embodiment of the present invention illustrating simplified operation of an alignment laser based on relaxed requirements.

Referring now to FIG. 5, there is shown an alignment laser system 345 having relaxed requirements for simplified operation of an alignment laser (not shown). More particularly, under these relaxed requirements, system 345 usually does not permit alignment laser light (not shown) to leave system 345. However, during cross-connect setup, alignment laser light can leave system 345 for a limited period of time. This period of time at setup is specified through a timer. Also, under these relaxed requirements, system 345 is configured to turn off the alignment laser (not shown) in the presence of client signal. However, during cross-connect setup, system 345 is configured to permit the use of alignment laser light (not shown) in the presence of the client signal over a limited period of time.

A system based on these relaxed requirements considerably simplifies the operation of the alignment laser. Based on the local LOS detection made by the input power detector of optical detector module 315 (also referred to herein as ODM 315), the decision to turn on the laser can be autonomously made by each MDM 320, 325. This approach has the advantage that (1) NCM 310 does not require coordination therethrough so as to control a switch on QPM 330 or to serialize the operation of the setup of a cross-connect for each of core A and core B, and (2) the interface between NCM 310 and each of MDM 320 and MDM 325 remains the same for the cross-connect setup, with or without alignment lasers.

The operation of the alignment laser may include some potential drawbacks. One potential drawback of system 345 includes the creation of a situation in which alignment laser light leaves system 345. This should not be a significant issue inasmuch as the alignment laser light leaving system 345 will be an unmodulated signal and will also be below −23 dBm. Another potential drawback of system 345 includes the creation of a situation in which weaker client signals may be temporarily undetected when both alignment laser light and client signals are simultaneously present. For most applications, however, this will not be a significant issue inasmuch as the client signal is expected to be around 0dBm and the alignment laser will only be on for a short period of time as controlled by a timer.

For completeness, the potential drawbacks are described hereinabove. In practice, however, these potential drawbacks should occur only during setup of the lightpath. The signal is usually selected from a path after confirmation of the quality of the lightpath by an attached Transport Network Element (not shown), i.e., after the setup of the lightpath. In an embodiment of the present invention, confirmation of the quality of the lightpath is conveyed in the form of a defect-clear indication.

Maintenance of Cross-Connects

Maintenance of cross-connects includes processes to verify the existence and quality of an optical path between specified ports. Such maintenance is required to compensate for drift in the system parameters involved in a given optical connection through the switch core. During this process, some adjustments in the mirror position may be required. It should be noted that for an active cross-connect with the client signal, the cross-connect is maintained as the default condition through a tracking property of the mirror alignment process. However, system-initiated maintenance of active cross-connects requires the use of alignment lasers when the client signal is not present. From an alignment laser point of view, the cross-connect maintenance is analogous to a creation of a cross-connect having different entry conditions.

Some of the network level protection systems, such as SONET APS (1:1) and SPMesh (shared path based mesh protection) provide capabilities to exercise equipment and facilities involved in protecting an idle path. The success or failure of such exercise capabilities is based on the observation of a good signal over the entire optical path. On the other hand, a local maintenance system includes operations to individually exercise many, if not all, of the modules required to create an optical path through a switching fabric. Accordingly, the local maintenance system is useful in detecting silent failures within the system at the nodal level and can significantly enhance the coverage of such diagnostics performed at the network level.

There are various ways to accomplish the maintenance of cross-connects. For example, maintenance can be scheduled, i.e., after expiry of a specified timer, so as to check if the cross-connect needs to be maintained. If needed, the maintenance is initiated. In another embodiment of the present invention, maintenance can be initiated by an event. Such initiation may occur upon the determination of an automatic condition requiring maintenance of a cross-connect or upon an explicit user request. For an automatic event, the subsequent maintenance due to a sustained outage requires the use of a timer.

For scheduled maintenance, such as after the expiration of a configurable timer, a master MDM initiates the realignment process for the connections having an absence of light at an output ODM. A slave MDM associated with each of these connections activates slow servos, which were previously in a frozen state. This realignment process also utilizes the alignment lasers controlled by the slave MDM. After the maintenance activity is finished, the slow servos are once again returned to a frozen state. In other words, after a correction to the alignment is applied, the mirrors will stay at this position until the next scheduled maintenance session. The frozen state of the slow servos is removed upon detection of a valid external signal, whereby the regular tracking property of the slow servo modifies the mirror position based on a maximum loss requirement.

It should be noted that maintenance is usually performed on active cross-connects without a client signal and is different than other system-initiated cross-connect activities involving idle ports, such as self-calibration of mirrors.

Verification of Cross-Connects

One of the main purposes for cross-connect maintenance activity is the verification of cross-connects. As each relates to verification of cross-connects, the existing and planned cross-connect inventory within a network element can be classified into three major categories. These three major categories are explained hereinbelow. It is noted that maintenance of a cross-connect as specified above can be used to perform verification for some of these categories.

Active Cross-Connects with Client Signal

This is the normal situation, where the cross-connect is in an active state with the client signal present. In this scenario, the verification can be easily reported by polling the state of various components involved in the optical path of the specified cross-connect. For example, the verification logic may proceed through the following sequence: (1) confirmation that the cross-connect exists in the connection map with the appropriate equipment in IS-NR state, and (2) the slow servo is in the "track" state, which implies that the mirrors are appropriately aligned and loss through the core does not exceed a given requirement.

Based on the physical and optical properties of the connection, an appropriate user response can be generated.

In case of an abnormal situation, some form of fault diagnosis and isolation may be required to generate an appropriate response to the user.

Active Cross-Connects with No Client Signal

This cross-connect category deals with the situation in which no client signal is available. In such a case, when a user request for verification of a cross-connect is received, it will be reported based on the last scheduled maintenance activity on the specified cross-connect. The underlying assumption is that, in the absence of a client signal, an MDM will autonomously verify active cross-connects at an interval which is enough to compensate for the parameter drift. If there are other issues with an active cross-connect besides parameter drift, then the regular polling of the cross-connect state performed by the NCM is sufficient and the NCM is assumed to reflect the current state of the cross-connect. Hence, even for this category of cross-connects, the last polled state of the cross-connect can be reported back to the user by the NCM.

Cross-Connect Does Not Exist

Figure 6:
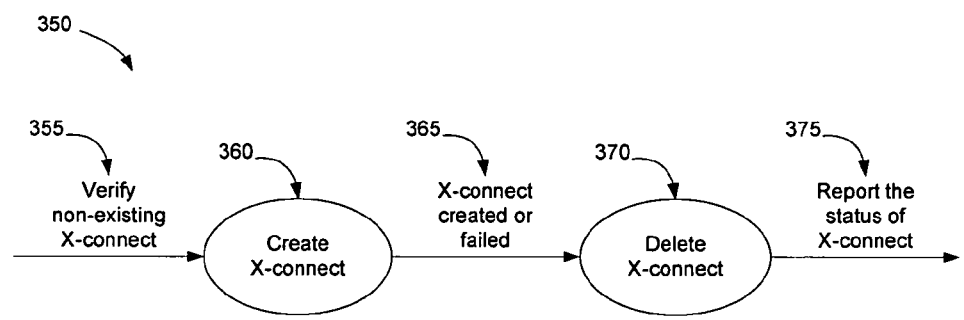
FIG. 6 is a schematic view of another embodiment of the present invention illustrating verification of cross-connects.

Referring next to FIG. 6, there is shown a flowchart 350 representing a process for verification of non-existing cross-connects. The method shown in flowchart 350 is implemented when a cross-connect verification request arises with no existing cross-connect. Such a request may be initiated to verify the connectivity between PXC ports without actually creating the cross-connect. This type of verification is useful to detect silent failures within the system and can be either system initiated or user initiated. The system-initiated requests for such idle ports fall under the scope of the feature of self-calibration of mirrors and will be discussed hereinbelow.

The requested verification will require that a maintenance activity be performed without an existing cross-connect between the ports in question if no client signal is available. This eventually translates into setting up a cross-connect through the alignment laser and, after the physical and optical path integrity has been verified, tearing down the cross-connect. The user is then notified of the result of the maintenance activity performed on the idle ports in question. Still referring to FIG. 6, the flowchart 350 comprises a logical breakdown of steps required to perform such a verification. A first step 355 of flowchart 350 comprises verifying a non-existing cross-connect. A second step 360 comprises creating a cross-connect. A third step 365 comprises determining whether the cross-connect was created or not. A fourth step 370 comprises reporting on the status of the cross-connect. The same behavior is utilized in the presence of a client signal. In this case, with a client signal present, the system may or may not require alignment laser light.

Since this type of verification involves the creation and deletion of cross-connects, the NCM will be involved in the initiation of the maintenance activity. The decision to turn on the alignment laser, however, is made locally by the MDM.

Some other system features, such as SP Mesh, utilize similar capability to temporarily set up a cross-connect on idle ports using alignment lasers during the negotiation phase of APS protocol. This is discussed hereinbelow in the section entitled "Shared Mesh Protection".

Self-Calibration of Mirrors

The self-calibration of mirrors is a system-initiated activity to update the calibration data required to enhance the accuracy of mirror alignment. This feature utilizes the idle ports or mirrors to make test cross-connects at scheduled intervals. These cross-connects are either internal loopbacks or are cross-connects to designated calibration ports. These cross-connects utilize alignment lasers where no client signal is available at an idle port.

Shared Mesh Protection

Shared mesh protection, which is also referred to hereinbelow as SPMesh, provides a SONET 1:n APS at the optical layer. For SPMesh, the protection path is shared by reserving appropriate resources without active cross-connects. These cross-connects are created only when a protection switching event is accepted by the APS logic of the protocol. When SPMesh is implemented in an opaque application with LOL everywhere behavior, the idle reserved ports along the protection path do not sense any client light and, hence, require alignment lasers so as to create cross-connects. Since, in this case, the cross-connect setup time influences the overall protection switching time, such cross-connect requests require real-time system behavior.

Speech is one of the PAC applications that influence the performance requirements for the use of alignment lasers.

Equipment Provisioning Diagnostics

Alignment lasers can be used to verify the internal optical connectivity of various modules at equipment provisioning time and should be part of provisioning (power up) diagnostics of an ODD and an QPM. Since most of the applications requiring the use of alignment lasers need a robust detection of internal LOS, verifying optical connectivity at the module level eliminates one possible failure mode associated with this detection.

QPM and ODM Connectivity Through MPT-12

In an embodiment of the present invention, some of the other diagnostics include, for example, measuring the insertion loss within the optical datapath and, alternatively, comparing the measured insertion loss at a time of equipment provisioning with a measured value from the time of equipment manufacture. Additionally, the measured value at the time of manufacture can be stored in an on-board EEPROM.

Figure 7:
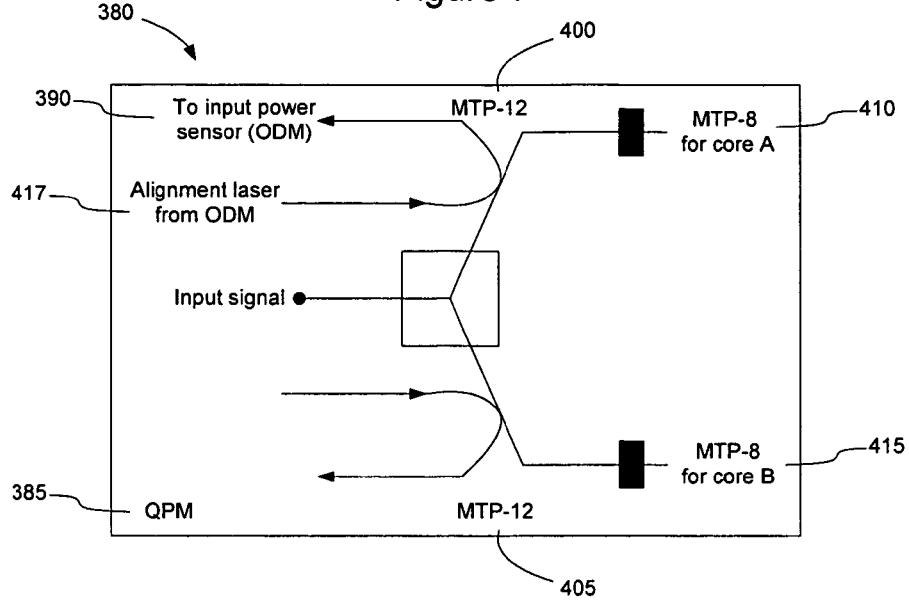
FIG. 7 is a schematic view of another embodiment of the present invention illustrating quad port module (QPM) and optical data module (ODM) connectivity through an MPT-12.

Referring now to FIG. 7, there is shown a logical view 380 of a quad port module 385 (also referred to hereinbelow as QPM 385) and an optical detector module 390 (also referred to hereinbelow as ODM 390) having connectivity through a MTP-12 400, 405. Here, connectivity is indicated in the form of parallel interconnects such as a MTP-8 410, 415. The same connectivity can be achieved through other means including, but not limited to, individual connectors (not shown). One of the diagnostics performed at the time of provisioning is injection of a signal through an alignment laser 417 so as to check if input power can be detected at ODM 390. It should be noted that this test fails if MTP-12's 400, 405 are not properly connected between ODM 390 and QPM 385.

Fault Isolation Within Optical Path

Figure 8:
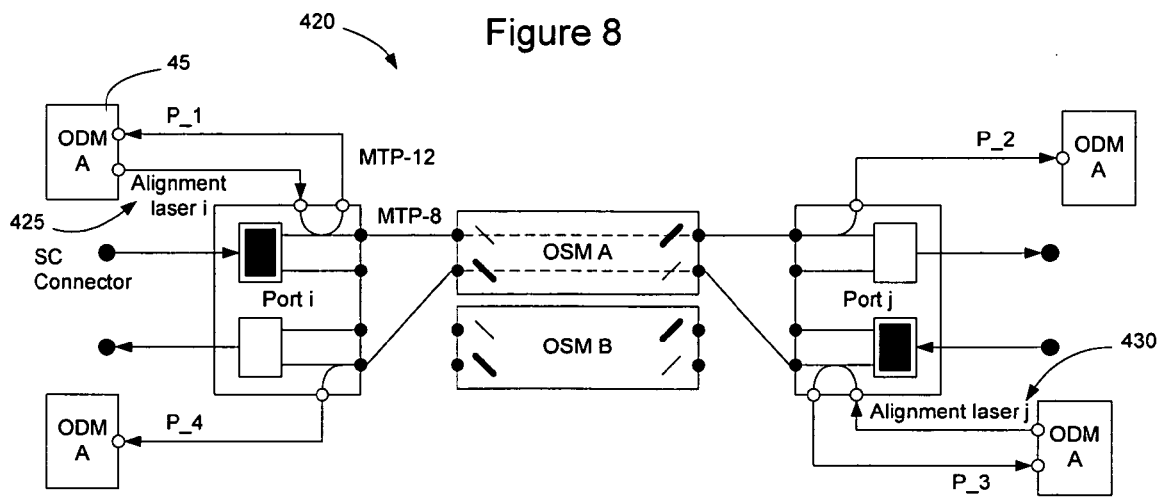
FIG. 8 is a schematic view of another embodiment of the present invention illustrating insertion loss measurement through alignment lasers.

Referring now to FIG. 8, there is shown a photonic cross-connect and alignment laser configuration 420 having a first alignment laser 425 and a second alignment laser 430. Alignment laser 425 and alignment laser 430 are utilized to isolate faults within an optical path through a switch core during operation. The fault isolation includes, but is not limited to, steps such as (1) using a set of linear equations to determine the insertion loss for each of the components along the optical datapath so as to isolate the root cause of a failure detected in the optical datapath, and (2) sequentially creating cross-connects having the same organization with multiple termination points or having multiple origination points, so as to isolate the failures in the optical datapath.

Injection of Test Signals

Alignment lasers can be used to inject specified test signals into an optical network. Some of the possible uses of these optical test signals include, for example, (1) local auto-discovery of connectivity between PXC and attached TNE's (Transport Network Elements), (2) remote auto-discovery of connectivity between two adjacent PXC's (peer-peer connectivity), and (3) verification of idle links between PXC and TNE's and between two PXC's.

What is claimed is:

1. Apparatus for alignment of a first input mirror and a first output mirror in a photonic cross-connect, said apparatus comprising:
   a first port and a second port selectively connected to one another over a first optical datapath therebetween, said first optical datapath containing said first input mirror and said first output mirror therein;
   a first alignment laser optically connected to said first optical datapath so as to selectively inject light along said first optical datapath, wherein said light injected along said first optical datapath is analyzed to provide feedback data for alignment of said first input mirror and said first output mirror; and
   a second optical datapath between said first port and said second port, said second optical datapath containing a second input mirror and a second output mirror therein, and a second alignment laser optically connected to said second optical datapath so as to selectively inject light along said second optical datapath, wherein said light injected along said second optical datapath is analyzed to provide feedback data for alignment of said second input mirror and said second output mirror.

2. Apparatus according to claim 1 further comprising a first optical signal module containing said first input mirror and said first output mirror along said first optical datapath, and said first optical signal module containing said second input mirror and said second output mirror along said second optical datapath.

3. Apparatus according to claim 2 further comprising a second optical signal module selectively connected to said first port and said second port over two additional optical datapaths therebetween.

4. Apparatus for alignment of a first input mirror and a first output mirror in a photonic cross-connect, said apparatus comprising:
   a first port and a second port selectively connected to one another over a first optical datapath therebetween, said first optical datapath containing said first input mirror and said first output mirror therein; and
   a first alignment laser optically connected to said first optical datapath so as to selectively inject light along said first optical datapath, wherein said light injected along said first optical datapath is analyzed to provide feedback data for alignment of said first input mirror and said first output mirror; and
   a third port and a fourth port selectively connected to one another over a third datapath therebetween, said third datapath containing a third input mirror and a third output mirror therein, a third optical data module optically connected to said third optical datapath at said fourth port, a multiple coupler optically connected to said third optical datapath at said third port so as to selectively inject light from said first alignment laser along said third optical datapath containing said third input mirror and said third output mirror from said third port to said fourth port.

5. Apparatus for alignment of a first input mirror and a first output mirror in a photonic cross-connect, said apparatus comprising:
   a first port and a second port selectively connected to one another over a first optical datapath therebetween, said first optical datapath containing said first input mirror and said first output mirror therein; and
   a first alignment laser optically connected to said first optical datapath so as to selectively inject light along said first optical datapath, wherein said light injected along said first optical datapath is analyzed to provide feedback data for alignment of said first input mirror and said first output mirror;
   wherein said alignment laser is optically connected to said optical datapath with a first coupler.

6. Apparatus according to claim 5 wherein said first coupler is disposed along said optical datapath between a splitter in said first port and said first input mirror.

7. Apparatus for alignment of a first input mirror and a first output mirror in a photonic cross-connect, said apparatus comprising:
   a first port and a second port selectively connected to one another over a first optical datapath therebetween, said first optical datapath containing said first input mirror and said first output mirror therein; and
   a first alignment laser optically connected to said first optical datapath so as to selectively inject light along said first optical datapath, wherein said light injected along said first optical datapath is analyzed to provide feedback data for alignment of said first input mirror and said first output mirror;
   wherein an optical data module is optically connected to said first optical datapath with a second coupler said optical data module being configured to analyze the light injected along said first datapath to provide said feedback data for alignment of said first input mirror and said first output mirror.

8. Apparatus according to claim 7 wherein said second coupler is disposed along said first optical datapath between a switch in said second port and said first output mirror.

9. Apparatus according to claim 1, wherein said light is contained within said first optical datapath and said second optical datapath so as to remain within said photonic cross-connect.

10. Apparatus for alignment of a first input mirror and a first output mirror in a photonic cross-connect, said apparatus comprising:
    a first port and a second port selectively connected to one another over a first optical datapath therebetween, said first optical datapath containing said first input mirror and said first output mirror therein; and
    a first alignment laser optically connected to said first optical datapath so as to selectively inject light along said first optical datapath, wherein said light injected along said first optical datapath is analyzed to provide feedback data for alignment of said first input mirror and said first output mirror;
    wherein said light emitted by said alignment laser is used to measure insertion loss through said photonic cross-connect.

11. Apparatus for alignment of a first input mirror and a first output mirror in a photonic cross-connect, said apparatus comprising:

a first port and a second port selectively connected to one another over a first optical datapath therebetween, said first optical datapath containing said first input mirror and said first output mirror therein; and a first alignment laser optically connected to said first optical datapath so as to selectively inject light along said first optical datapath, wherein said light injected along said first optical datapath is analyzed to provide feedback data for alignment of said first input mirror and said first output mirror;

wherein said alignment laser is disposed within at least one of a first optical data module and a second optical data module.

* * * * *